United States Patent
Chuang

(10) Patent No.: US 10,259,657 B2
(45) Date of Patent: Apr. 16, 2019

(54) DUST COVER FOR AN ELECTRIC ROLLER

(71) Applicant: WORLDWIDE LOGISTICS CORPORATION, New Taipei (TW)

(72) Inventor: Kuo-Chieh Chuang, New Taipei (TW)

(73) Assignee: Worldwide Logistics Corporation, New Taipei (TW)

( * ) Notice: Subject to any disclaimer, the term of this patent is extended or adjusted under 35 U.S.C. 154(b) by 0 days.

(21) Appl. No.: 15/925,872

(22) Filed: Mar. 20, 2018

(65) Prior Publication Data
US 2019/0039833 A1   Feb. 7, 2019

(30) Foreign Application Priority Data
Aug. 3, 2017 (TW) .............................. 106211447 U

(51) Int. Cl.
*B65G 39/09* (2006.01)
*B65G 39/12* (2006.01)
*B65G 23/23* (2006.01)
*B65G 13/07* (2006.01)

(52) U.S. Cl.
CPC ............. *B65G 39/09* (2013.01); *B65G 39/12* (2013.01); *B65G 13/07* (2013.01); *B65G 23/23* (2013.01)

(58) Field of Classification Search
CPC ....................................................... B65G 39/09
See application file for complete search history.

(56) References Cited

FOREIGN PATENT DOCUMENTS
CN        202272467 U  *  6/2012

* cited by examiner

*Primary Examiner* — Gene O Crawford
*Assistant Examiner* — Lester III Rushin
(74) *Attorney, Agent, or Firm* — Rosenberg, Klein & Lee

(57) ABSTRACT

A dust cover has a base body and an outer cover. The base body is a cylinder and is made of an electrically conductive material. The base body has an axis, a bearing block, and an axial hole. The bearing block is located at an outer surface of the base body. The axial hole is formed axially through the base body. The outer cover is a circular disk and is made of an electrically non-conductive material. The outer cover has an axis, a first end, a second end, a cover body, and an axial hole. The first end of the outer cover is connected with the base body. The axis of the outer cover is the same as the axis of the base body. The axial hole is formed axially through the outer cover and communicates with the axial hole of the base body.

6 Claims, 6 Drawing Sheets

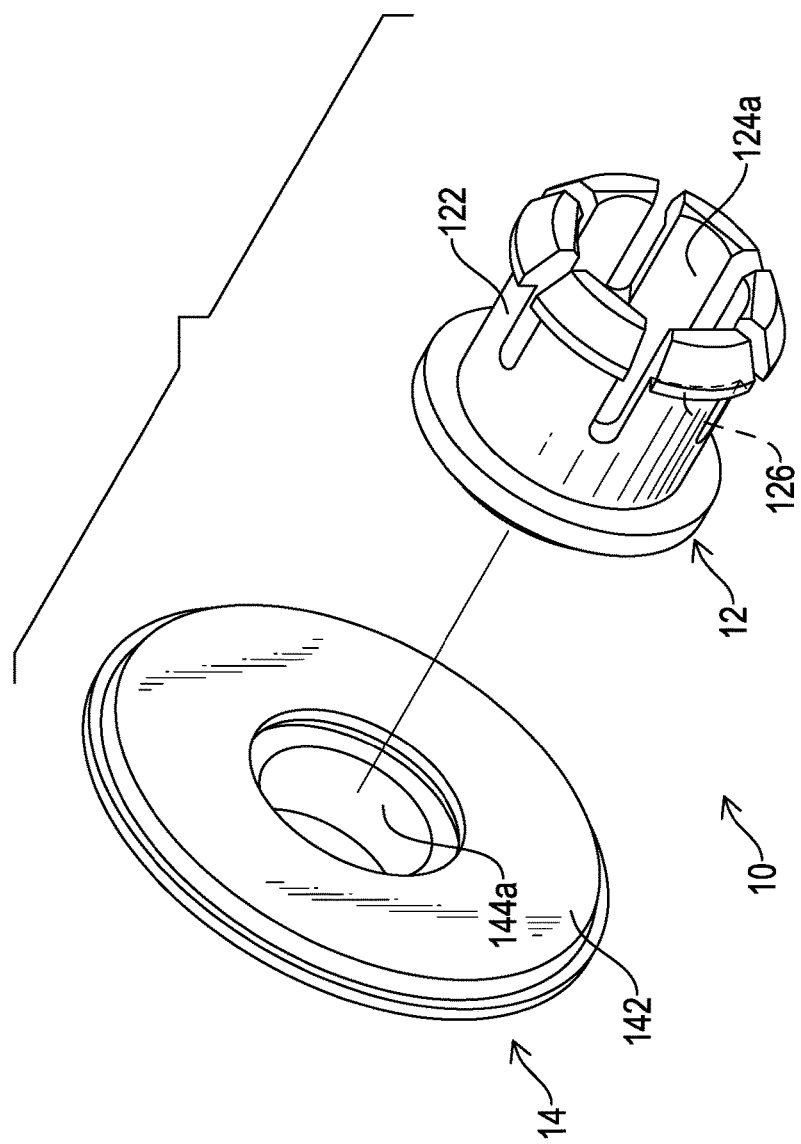

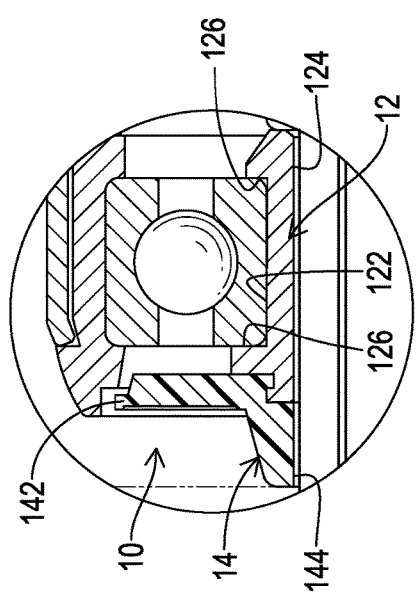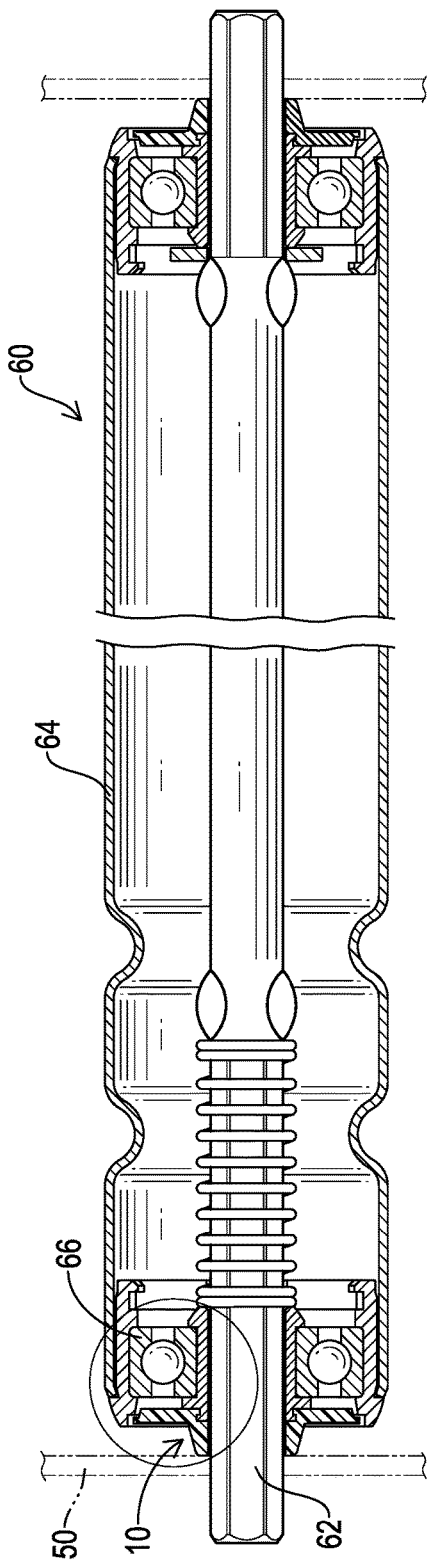
FIG.4A
FIG.4

DUST COVER FOR AN ELECTRIC ROLLER

BACKGROUND OF THE INVENTION

1. Field of the Invention

The invention relates to a dust cover, and more particularly to a dust cover which is applied in an automatic transporting apparatus.

2. Description of Related Art

An automatic transporting apparatus is used to transport products by controlling multiple electric rollers. The automatic transporting apparatus is mainly applied in a distribution center, or widely applied in an assembly line or a storage facility.

With reference to FIG. 5, a conventional automatic transporting apparatus has a support frame 50, multiple electric rollers 60, and a control unit 70. The multiple electric rollers 60 are mounted on the support frame 50 at spaced intervals. The control unit 70 is connected with the multiple electric rollers 60. Each electric roller 60 has a driving motor. The control unit 70 may control rotation speeds and directions of the electric roller 60.

The electric rollers 60 have different specifications, but the electric rollers 60 have the same appearance in terms of size, configuration, and color. Therefore, to identify the specification of each electric roller 60 is difficult. Currently, the main method for distinguishing the torque specifications of the electric rollers 60 is to distinguish the different colors of electric wires. However, the identification accuracy is low in this way.

With reference to FIG. 6, the electric roller 60 has a main rod 62, a cylinder 64, two bearings 66, and two dust covers 68. The conventional dust cover 68 is integrally made of a conductive material such as a carbonaceous material or a plastic material. In addition to the function of preventing external dust from entering the electric roller 60, the dust cover 68 also has the function of electrostatic transmission. However, the dust cover 68 is limited to a single color, and directly providing the conductive material in other colors by dye or any other method may be expensive. If the material of the dust cover 68 is replaced with a less costly dyeable plastic for identification, the electrostatic grounding of the motor electric rollers 60 will be reduced.

SUMMARY OF THE INVENTION

The main objective of the present invention is to provide a dust cover that is applied in the automatic transporting apparatus.

The dust cover has a base body and an outer cover. The base body is a cylinder and is made of an electrically conductive material. The base body has an axis, a bearing block, and an axial hole. The bearing block is located at an outer surface of the base body. The axial hole is formed axially through the base body. The outer cover is a circular disk and is made of an electrically non-conductive material. The outer cover has an axis, a first end, a second end, a cover body, and an axial hole. The first end of the outer cover is connected with the base body. The axis of the outer cover is the same as the axis of the base body. The axial hole is formed axially through the outer cover and communicates with the axial hole of the base body.

Other objects, advantages, and novel features of the invention will become more apparent from the following detailed description when taken in conjunction with the accompanying drawings.

BRIEF DESCRIPTION OF THE DRAWINGS

FIG. 3 is an exploded perspective view of a second embodiment of the dust cover in FIG. 1;

FIG. 4 is a side view in partial section of the dust cover mounted on an electric roller in FIG. 1;

FIG. 4A is an enlarged side view in partial section of the dust cover mounted on an electric roller in FIG. 3;

DETAILED DESCRIPTION OF PREFERRED EMBODIMENT

Figure 1:
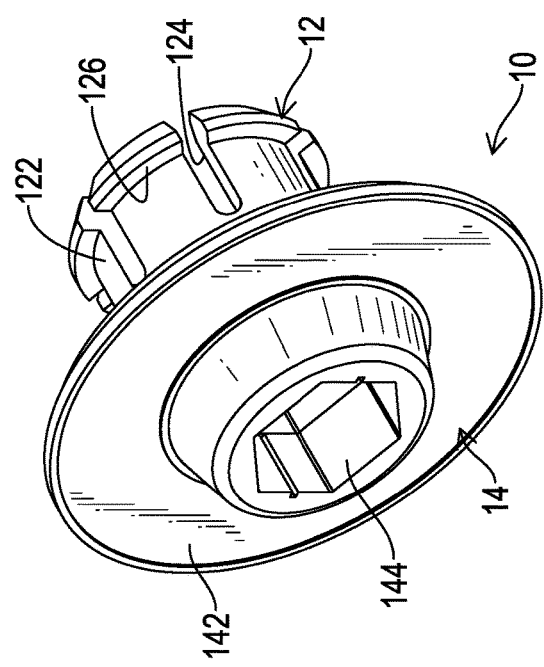
FIG. 1 is a perspective view of a dust over of a first embodiment in accordance with the present invention.
Figure 2:
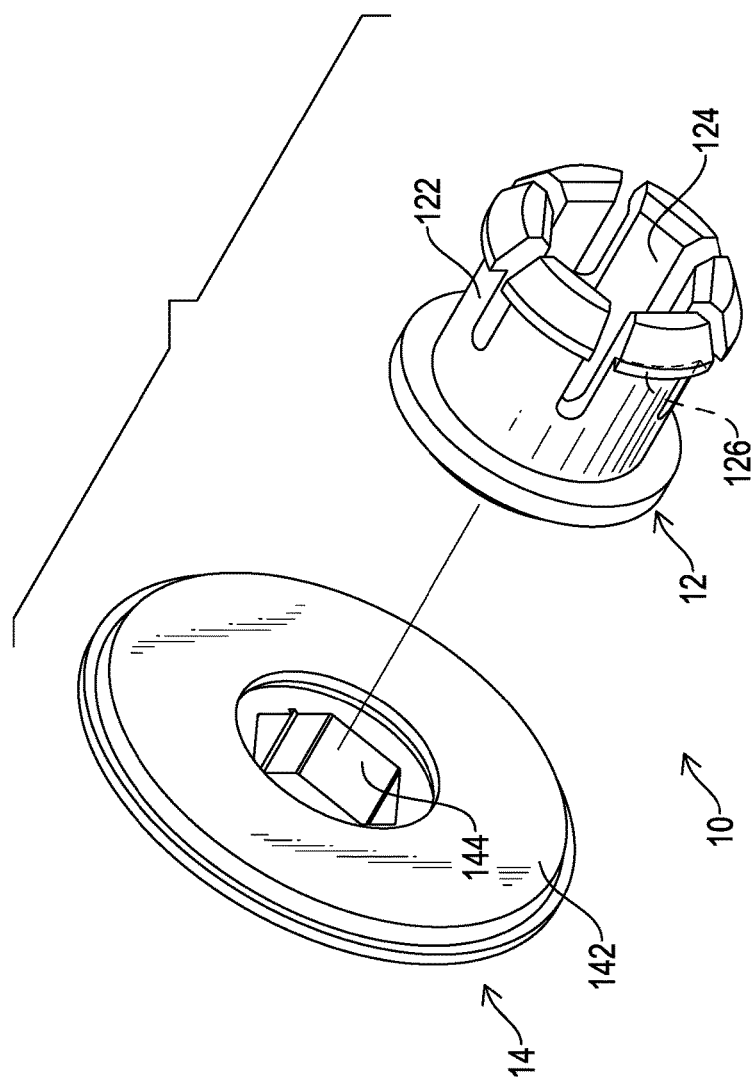
FIG. 2 is an exploded perspective view of the dust cover in FIG. 1.
Figure 5:
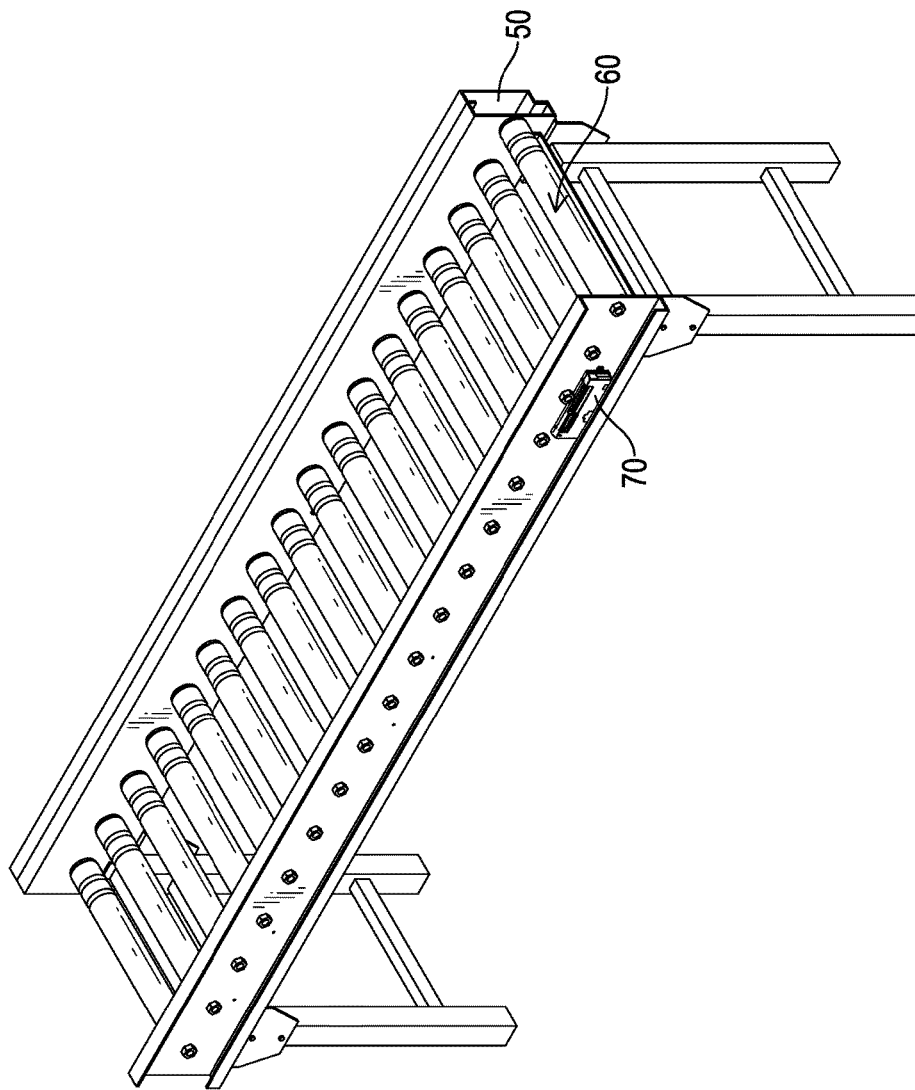
FIG. 5 is a perspective view of a conventional automatic transporting apparatus.
Figure 6:
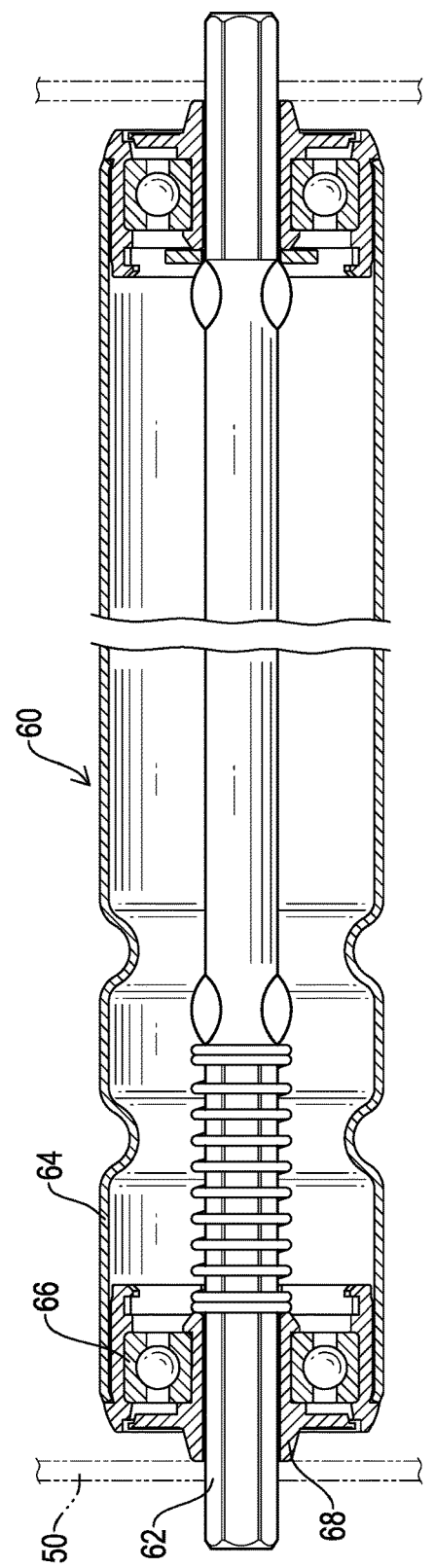
FIG. 6 is an enlarged side view in partial section of a conventional electric roller of the conventional automatic transporting apparatus.

With reference to FIGS. 1, 2, and 4, a dust cover 10 for an electric roller in accordance with the present invention comprises a base body 12 and an outer cover 14.

The base body 12 is a cylinder, is made of an electrically conductive material, and has an axis and a bearing block 122. The bearing block 122 is mounted on an outer surface of the base body 12. The bearing block 122 has an outer diameter, and the outer diameter of the bearing block 122 is equal to an inner diameter of a bearing 66. The bearing block 122 has two ends and two abutting faces 126. The two abutting faces 126 are respectively formed at the two ends of the bearing block 122. An axial hole 124 is formed through the base body 12. With reference to FIGS. 2 and 3, the cross section of the axial hole 124 of the base body 12 may be a hexagon or a circle.

The outer cover 14 is a circular disk, is made of an electrically non-conductive material, and has an axis, a first end, a second end, a cover body 142, and an axial hole 144. The first end of the outer cover 14 is connected with the base body 12. The axis of the outer cover 14 is the same as the axis of the base body 12. The axial hole 144 is formed axially through the outer cover 14 and communicates with the axial hole 124 of the base body 12. A cross sectional shape of the axial hole 144 of the outer cover 14 is the same as a cross sectional shape of the axial hole 124 of the base body 12. The diameter of the axial hole 144 of the outer cover 14 may be larger than the diameter of the axial hole 124 of the base body 12.

The base body 12 and the outer cover 14 can be joined by plastic coating or secondary injection, or by a simple structural design to connect the base body 12 and the outer cover 14.

With reference to FIG. 4, two dust covers 10 are respectively mounted on two ends of an outer cylinder 64. The outer cover 14 of the dust cover 10 is mounted on an outer surface of the electric roller 60. The outer cover 14 of the dust cover 10 may prevent the dust entering inside of the electric roller 60. A user may see the outer cover 14 directly.

Two bearings 66 are respectively mounted around the two bearing blocks 122 of the two dust covers 10. The outer diameter of the bearing block 122 is equal to the inner diameter of the bearing 66. The distance between the two abutting faces 126 is equal to the height of the bearing 66. The position of the bearing 66 is limited by the two abutting faces 126. A main rod 62 is mounted through the axial holes 124 of the base bodies 12 of the two dust covers 10, and the cross sectional shape of the axial holes 124 of the base bodies 12 of the two dust covers 10 is the same as the cross sectional shape of the main rod 62. The cross sectional shape of the main rod 62 may be hexagonal or circular. The main rod 62 has two ends respectively mounted on two side walls of a support frame 50. The support frame 50 is made of iron sheets.

Static electricity generated during the operation of the electric roller 60 can be conducted from the outer cylinder 64 to the metal shell of the bearing 66 and conducted to the main rod 62 via the base body 12. The outer cover 14 of each dust cover 10 can be provided with different colors according to different specifications. The user can distinguish the specifications of the electric rollers 60 through the colors of the outer cover 14.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A dust cover comprising:
   a base body being a cylinder, made of an electrically conductive material, and having
      an axis;
      a bearing block mounted on an outer surface of the base body; and
      an axial hole formed axially through the base body; and
   an outer cover being a circular disk, made of an electrically non-conductive material, and having
      an axis being the same as the axis of the base body;
      a first end connected with the base body;
      a second end;
      a cover body; and
      an axial hole formed axially through the outer cover and communicating with the axial hole of the base body, and a diameter of the axial hole of the outer cover being larger than a diameter of the axial hole of the base body, wherein a color of the base body is different from a color of the outer cover.

2. The dust cover as claimed in claim 1, wherein the bearing block has two ends and two abutting faces, and the two abutting faces are respectively formed at the two ends of the bearing block.

3. The dust cover as claimed in claim 1, wherein the axial hole of the base body is a hexagon.

4. The dust cover as claimed in claim 2, wherein the axial hole of the base body is a hexagon.

5. The dust cover as claimed in claim 1, wherein the axial hole of the base body is a circle.

6. The dust cover as claimed in claim 2, wherein the axial hole of the base body is a circle.

* * * * *